United States Patent
Golubski et al.

(10) Patent No.: US 12,157,259 B2
(45) Date of Patent: Dec. 3, 2024

(54) METHOD FOR STARTING OR TERMINATING PRODUCTION OF A FILM IN A FILM MANUFACTURING MACHINE, FILM MANUFACTURING MACHINE AND COMPUTER PROGRAM PRODUCT

(71) Applicant: Windmöller & Hölscher KG, Lengerich (DE)

(72) Inventors: Karsten Golubski, Lengerich (DE); Tobias Kulgemeyer, Lengerich (DE); Martin Backmann, Lengerich (DE); Tim Kirchhoff, Lengerich (DE); Jens Althermeler, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 17/767,792

(22) PCT Filed: Oct. 7, 2020

(86) PCT No.: PCT/EP2020/078069
§ 371 (c)(1),
(2) Date: Apr. 8, 2022

(87) PCT Pub. No.: WO2021/069475
PCT Pub. Date: Apr. 15, 2021

(65) Prior Publication Data
US 2024/0083083 A1    Mar. 14, 2024

(30) Foreign Application Priority Data
Oct. 11, 2019  (DE) .................... 10 2019 215 694.0
Oct. 15, 2019  (DE) .................... 10 2019 215 875.7

(51) Int. Cl.
*B29C 48/32*    (2019.01)
*B29C 37/00*    (2006.01)
(Continued)

(52) U.S. Cl.
CPC ...... *B29C 48/0018* (2019.02); *B29C 37/0096* (2013.01); *B29C 48/0019* (2019.02);
(Continued)

(58) Field of Classification Search
CPC ............ B29C 37/0096; B29C 48/0018; B29C 48/0019; B29C 48/0022; B29C 48/08;
(Continued)

(56) References Cited

U.S. PATENT DOCUMENTS 4,189,288 A * 2/1980 Halter ..................... B29C 48/92
                                                                425/141
5,104,593 A    4/1992 Joseph
(Continued)

FOREIGN PATENT DOCUMENTS

JP            05220839 A  *  8/1993  ............. B29C 55/28

OTHER PUBLICATIONS

International Searching Authority—International Search Report, pertaining to International Application No. PCT/EP2020/078069, dated Dec. 23, 2020, together with the Written Opinion of the International Searching Authority and translation pages of ISR, 12 pages.

*Primary Examiner* — Leo B Tentoni
(74) *Attorney, Agent, or Firm* — Sunstein LLP

(57) ABSTRACT

The invention describes a process for starting up a film production in a film manufacturing machine, in particular a blown film machine, by means of a control device, comprising the following steps:
  detecting a start-up request
  setting start-up parameters
  providing film material
  commencing the film production
  setting film production parameters.

14 Claims, 3 Drawing Sheets

Figure 1:
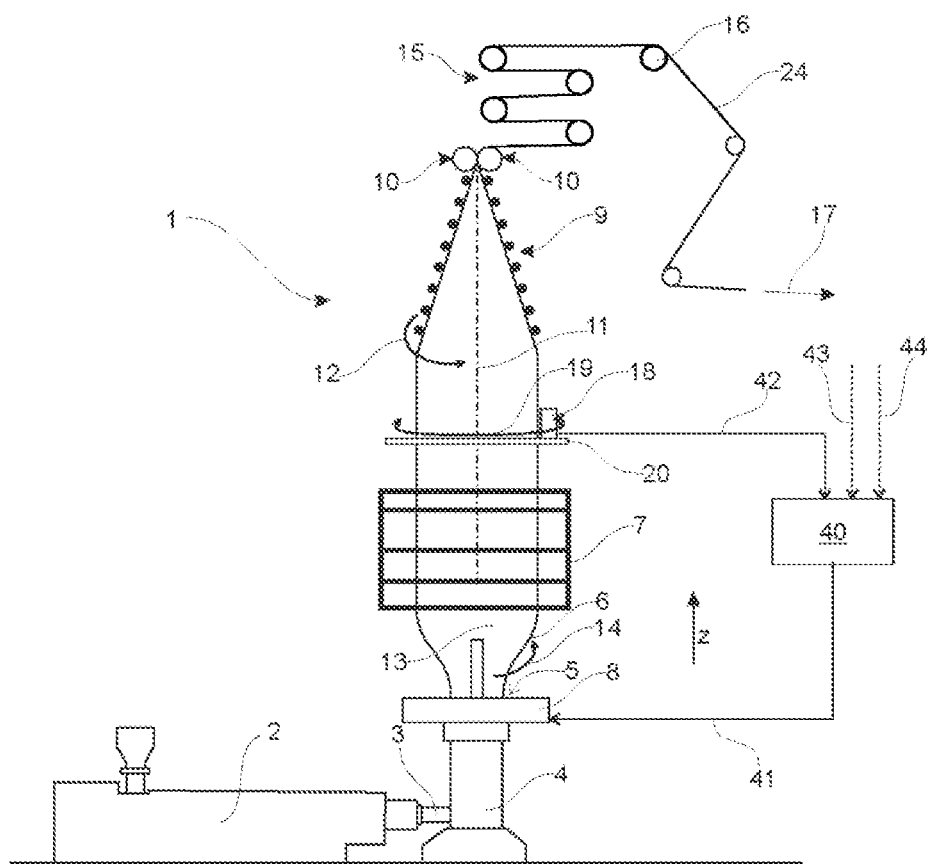

(51) Int. Cl.
*B29C 48/00* (2019.01)
*B29C 48/08* (2019.01)
*B29C 48/325* (2019.01)
*B29C 48/355* (2019.01)
*B29C 48/92* (2019.01)
*B29C 55/28* (2006.01)

(52) U.S. Cl.
CPC .......... *B29C 48/0022* (2019.02); *B29C 48/08* (2019.02); *B29C 48/325* (2019.02); *B29C 48/355* (2019.02); *B29C 48/92* (2019.02); *B29C 55/28* (2013.01); *B29C 2793/0027* (2013.01); *B29C 2793/0036* (2013.01); *B29C 2793/009* (2013.01); *B29C 2948/92485* (2019.02); *B29C 2948/92561* (2019.02); *B29C 2948/926* (2019.02); *B29C 2948/92647* (2019.02); *B29C 2948/92704* (2019.02); *B29C 2948/9298* (2019.02)

(58) Field of Classification Search
CPC ..... B29C 48/269; B29C 48/32; B29C 48/325; B29C 48/355; B29C 48/92; B29C 55/28; B29C 2793/0036; B29C 2793/009; B29C 2948/92485; B29C 2948/92561; B29C 2948/92647; B29C 2948/92704; B29C 2948/9298
USPC ..... 264/40.1, 40.3, 40.7, 145, 564; 425/135, 425/140, 141, 145, 308, 315, 326.1, 377, 425/461
See application file for complete search history.

(56) References Cited

U.S. PATENT DOCUMENTS

| | | | | |
|---|---|---|---|---|
| 5,162,089 | A | * | 11/1992 | Halter ..................... B29C 48/92 |
| | | | | 425/141 |
| 5,727,723 | A | * | 3/1998 | Cree ....................... B65H 23/16 |
| | | | | 425/326.1 X |
| 10,207,448 | B2 | | 2/2019 | Bachman et al. |
| 2002/0076459 | A1 | | 6/2002 | Joseph |
| 2002/0158360 | A1 | * | 10/2002 | Joseph .................. B29C 48/92 |
| | | | | 264/564 X |

* cited by examiner

METHOD FOR STARTING OR TERMINATING PRODUCTION OF A FILM IN A FILM MANUFACTURING MACHINE, FILM MANUFACTURING MACHINE AND COMPUTER PROGRAM PRODUCT

CROSS-REFERENCE TO RELATED APPLICATIONS

This application is the national stage entry under 35 U.S.C. § 371 of International Patent Application No. PCT/EP2020/078069 filed on Oct. 7, 2020, and claims the benefit of German Patent Application Nos. 10 2019 215 694.0 filed Oct. 11, 2019, and 10 2019 215 875.7 filed Oct. 15, 2019, the disclosures of which are incorporated herein by reference in their entirety.

The invention relates to a process according to claim 1, a process according to claim 12, a film manufacturing machine according to claim 13, and a computer program product according to claim 14.

When starting up production of a film in a film manufacturing machine, various steps must be carried out until production of the film takes place with the desired result. Starting up the film production accordingly is labor-intensive for the operator. The same is true for terminating a film production. The effort for the operator results also in significant time lost when starting up the film production. Moreover, film is generated that is considered scrap. Altogether, this leads to a low efficiency of the film production. This is especially true for blown film machines, as these are often large due to the film production process employed, so that many components thereof are accessible only with some expenditure of time.

It is therefore the object of the present invention to propose a process and a film production machine with which the efficiency of the film production may be increased.

This object is achieved according to the invention by all of the features of claim 1. Possible configurations of the invention are specified in the subclaims.

According to the present invention, there is provided a process comprising the following steps:
  detecting a start-up request
  setting start-up parameters
  providing film material
  commencing the film production
  setting film production parameters.

Individual steps and particularly all of the steps are performed by a control device. Thus, start-up of the film production begins with an external trigger being present that issues the request to start up. This trigger is detected by the control device, which then initiates in particular all or at least most of the necessary subsequent steps. After a start-up request exists, which is issued in particular when no film production is currently taking place, start-up parameters are set in a further step, in particular by the control device, that enable or facilitate drawing of the film or plastic strand, respectively, through all of the components necessary for the production of the desired film.

A further step in the process is the provision of plastic material, this being the already molten plastic material that swells from an extrusion die and/or that has already been drawn in through all of the aforementioned components.

A further step is the commencement of the film production, wherein during the production, plastic material continually discharges from an extrusion die, is transported and eventually wound up. While being transported, the plastic material may undergo further processing; the possible processing steps will be specified and/or explained in more detail later, and in some cases in connection with advantageous process steps.

Another constituent part of the process according to the invention is the setting of film production parameters that are required for the production of the desired film. These film production parameters comprise in particular settings of the film manufacturing machine (mechanical parameters, electrical parameters, pneumatic parameters, etc.), types of raw materials, quantities and inflows thereof, parameters of the film, and quality characteristics thereof. The generic term often used for all of these parameters and settings is the word "formula".

After the aforementioned steps have been performed, production of the desired film thus already takes place after a short, the desired film complying in particular with the user requirements.

In a first advantageous implementation of the inventive idea it is provided that detecting a start-up request comprises registering an actuation, by the operator, of a switch on a control device. Therefore, it is preferably up to the operator to trigger the start-up of the film production. The operator requests the start-up, but in particular also indicates to the control device that he is ready to receive indications, requests, error messages, etc. and to react to them if applicable. A switch in this context may be any instrument for input. In particular, a switch a touch panel on a monitor of the control device. Input by the operator within the scope of the present invention may generally take place by: pushing a button, voice input, gesture control, mouse click, touching a touch panel on a touchscreen monitor, but also operating a mobile terminal that is connected in particular wirelessly to the control apparatus.

Alternatively, detecting a start-up request may also comprise detecting of an electronic signal. This may be the case, for example, when a start-up is to be triggered using a mobile operating unit or from a central computer, for example a central computer in the film manufacturing company. In this case it is preferred if the operator, via an input unit of the control device, his readiness to perform the start-up process. A request to the operator may be, for instance, that the operator has to confirm that raw materials for extrusion have been made available.

It is also advantageous if, after detecting a start-up request, the control device issues a request to draw in film material over or through a component of the film manufacturing machine. This request is directed in particular to the operator, if it is necessary to draw in the film material through the film manufacturing machine. In many cases, however, it is not necessary to already wind up this film material. It is even possible for all of the drives of for example feed rolls to be switched off. In cases in which film material from the previous production job has remained in the film manufacturing machine, in particular still interconnected, the request to draw in film material may be issued also in the form of control commands for example to drives of conveying rolls. In this case, the operator may have an observer function, so that he may operate the control device accordingly in the event of any errors.

It is furthermore advantageous that prior to the commencement of the film production, a detection takes place of information regarding the drawing-in of the film material having taken place. This information may have been issued by at least one sensor, or by the operator who makes a corresponding input into the control device.

In a further embodiment, it is provided that at least one start-up parameter is based on at least one of the following parameters:
- extremal parameters
- stored formula and production data from a prior film production
- parameters from a modelling of formula and production data.

External parameters means in particular maximum values which a mechanically actuated component of the film manufacturing machine is able to assume, for example the widest width to which a calibration cage can move. These parameters facilitate the drawing-in of film material. Start-up parameters may also be a set of parameters, however, that are particularly well suited for drawing-in film material. However, stored formula and production data from a prior film production, in particular a film production with an identical or similar formula, may serve as start-up parameters, either directly or in a form adapted for the start-up. This avoids large travel distances in particular of mechanical components, so that the film production can be set into operation quickly.

Furthermore, it is advantageous if during or after the commencement of the film production the film is wound up onto at least one film roll.

Furthermore, the setting of start-up parameters preferably comprises at least one of the following steps, wherein the control device in particular issues a control command to perform the respective step:
- providing raw materials for a start-up formula
- setting a moveable component of the film manufacturing machine to maximum opening width
- setting a predetermined output performance of an extruder of the film manufacturing machine
- setting a predetermined temperature of an extruder of the film manufacturing machine
- setting a volume flow of a fluid with which the film material will be cooled directly or indirectly
- setting a position of a slideable component of the film machine relative to a principal axis of inertia of the film material
- moving to a parking position
- setting a predetermined angle of a rotatable or pivotable component of the film manufacturing machine relative to the principal axis of inertia of the film material.

Specifically, at least one of the steps listed in the following may be performed. A web break detector is switched off. The calibration cage is moved to the highest position thereof (maximum distance from the blow head). The calibration cage is set to a start-up width, in particular to a maximum width thereof. A support cage is moved to a start-up value. A thickness measuring device is switched off. A haul-off is moved into a startup position. A squeeze roll of the squeeze device is pivoted out of position. In a fixing unit and/or stretching apparatus, pressure rolls are pivoted out of position and stretching factors are set to 1, i.e., stretching rolls that have differing circumferential velocities in the film production process are set to same circumferential velocities. Furthermore, other pressure rolls in the web transport are pivoted out of position.

In a further step it is advantageous if at least some of the web drives are driven in reverse prior to, during, or immediately after setting the start-up parameters, so that in particular any film web still located in the transport path from a prior film production will be moved against the transport direction of the film production. This allows the newly forming film bubble to be tacked to the end of the old film web, so that the new film bubble and the film web being formed therefrom can easily be drawn through the film manufacturing machine after tacking. This step may also be requested for example by the operator by means of an input.

In a further advantageous embodiment of the invention it is provided that the setting of start-up parameters relates to at least one of the following components of the film manufacturing machine, the control device in particular the control device issuing at least one control command to the respective component:
- an extruder
- a cooling ring
- an air routing apparatus
- an interior bubble-cooling means
- a calibration cage
- a collapsing apparatus
- a haul-off apparatus
- a reversing apparatus
- a turner bar
- a stretching unit
- a cross-cutting unit in a winder
- a longitudinal cutting apparatus
- a transport roll
- a flatness measuring apparatus
- a thickness measuring apparatus
- a winding apparatus
- a supply apparatus for a raw material.

After start-up parameters have been set by the control device and the operator has completed the work steps to be carried out by him and this has been confirmed via an input by the operator, the film material can be provided. Prior to that there may be displayed on a monitor, in particular on a monitor of the control device, that setting of the start-up parameters has been completed.

Preferably, however, there also takes place, prior to providing the film material, a step to detect a request to start up the extrusion. This allows the operator to separately confirm once more that he is prepared to receive the plastic material for the purpose of drawing same into the machine.

The step of providing the film material comprises in particular the steps of starting up extruders for producing a plastic melt from pellets and turning on at least one conveyor for conveying pellets. A conveyor may be configured, for example, as a suction conveyor. It is advantageous to start up all of the conveyors that are necessary for the film production.

The reverse driving of web drives may take place simultaneously with the step of providing the film material.

It is advantageous if, in a further step, the web transport is started. This means that web draw rollers in particular are now being driven, so that as soon as the plastic melt has been drawn from the die of the blow head and has been connected to a thread-up band that has previously been laid through the transport path, or to the film web from the previous film production, the new plastic material can begin to be drawn in. The web draw rollers include in particular the haul-off-rolls, which have the task of drawing the plastic melt from the die head. In particular—if present—an advancing means, a fixing unit and/or a stretching apparatus are now set into operation as well. A winding station may be started within this step as well.

It is advantageous if, after providing the film material and in particular prior to setting film production parameters, the following steps are performed:
- starting an interior bubble-cooling means for creating a film bubble cutting or puncturing the film bubble upstream of a roll and in particular upstream of the haul-off apparatus.

This step initially creates a bubble shape of the film material, but, since, as a rule, same will be flattened for further transport within the film manufacturing machine, the film bubble is also punctured or cut, in order to be able to remove any air that remains between the layers of the flattened film bubble in particular during the startup process. The film bubble, as a rule, is restricted to the region between the die lip and a pair of squeeze rolls. Downstream of the pair of squeeze rolls, the film bubble is flattened as completely as possible, i.e., no residual gas remains anywhere in the film manufacturing machine.

In order to enable the flattened film bubble to be divided into two layflat webs, these layflat webs must be separated by means of cutting knives. To do this, it is advantageously provided that, after providing the film material and in particular prior to setting film production parameters, the following steps are performed:

- winding up the two-layer film web onto a first film roll
- creating a longitudinal cut in a film bubble of the film material by means of a cutting apparatus that is arranged in particular upstream of the haul-off apparatus,
- longitudinal cut spaced apart from the lateral edges
- flattening the film bubble to form a two-layer film web
- inserting at least one lateral edge slitting apparatus between the layers of the two-layer film web via the longitudinal cut.
- sliding the lateral edge slitting apparatus to a lateral edge of the two-layer film web.
- lifting apart the two layers of the two-layer film web
- cross-separating one of the layers of the two-layer film web in order to create a new web front end
- winding the new web front end onto a second film roll It is also preferred if a step is carried out in which the film production parameters are optimized, in particular after the film production has commenced. Optimizing comprises in particular working towards adherence to formula specifications, in particular composition and thickness of individual layers of the film, thickness and/or width of the film, inflation parameters, haul-off parameters (biaxial stretching parameters).

In order to be able to also maintain the film production at the desired value, it is preferred if a step is additionally carried out in the process according to the invention, in which at least one control loop is switched on, in order to regulate at least one film production parameter. The control loop may, for example, be the thickness profile of a film, the flatness, or the transparency.

The aforementioned object is achieved also by a process for terminating a film production in a film manufacturing machine, in particular a blown film machine, by means of a control device, comprising the following steps:

- detecting a termination request
- adjusting termination parameters
- terminating the film production.

In particular the step of setting terminating parameters enables a controlled slowing of the film transport to standstill, so that a remnant of the film produced remains in the film production line. This simplifies in particular the drawing in of film after restarting the film manufacturing machine, which saves time.

The object is achieved also by a film manufacturing machine, in particular a blown film machine, for performing a process according to any of claims 1 to 13, having at least one extruder for producing and providing molten plastic material, a die device from which the molten plastic material can be drawn in the form of a film, at least one transport roll, at least one winding device whereby the can be wound up, and at least one control device that issues control commands for performing the steps of the process.

With such a film manufacturing machine according to the invention, the same advantages are achieved that have been described in connection with a process according to the invention.

Lastly, the above-stated object is achieved by a computer program product comprising instructions which, when the program is executed on a control device comprising a computer, cause a film manufacturing machine to perform the steps of a process having the features of any of claims 1 to 13.

Additional advantages, features and details of the invention will become apparent from the following description, in which various example embodiments are described in detail with reference to the figures. The features mentioned in the claims and in the description may each be essential to the invention when taken alone or in any combination of features mentioned. It goes without saying that within the scope of the disclosure as a whole, features and details that are described in connection with the process according to the invention also apply in connection with the film manufacturing machine according to the invention and vice versa in each case, so that with respect to the disclosure, mutual reference to the individual aspects of the invention is or may always be made.

The figures show as follows:

FIG. 1 a side view of a device for producing a tubular film

Figure 2:
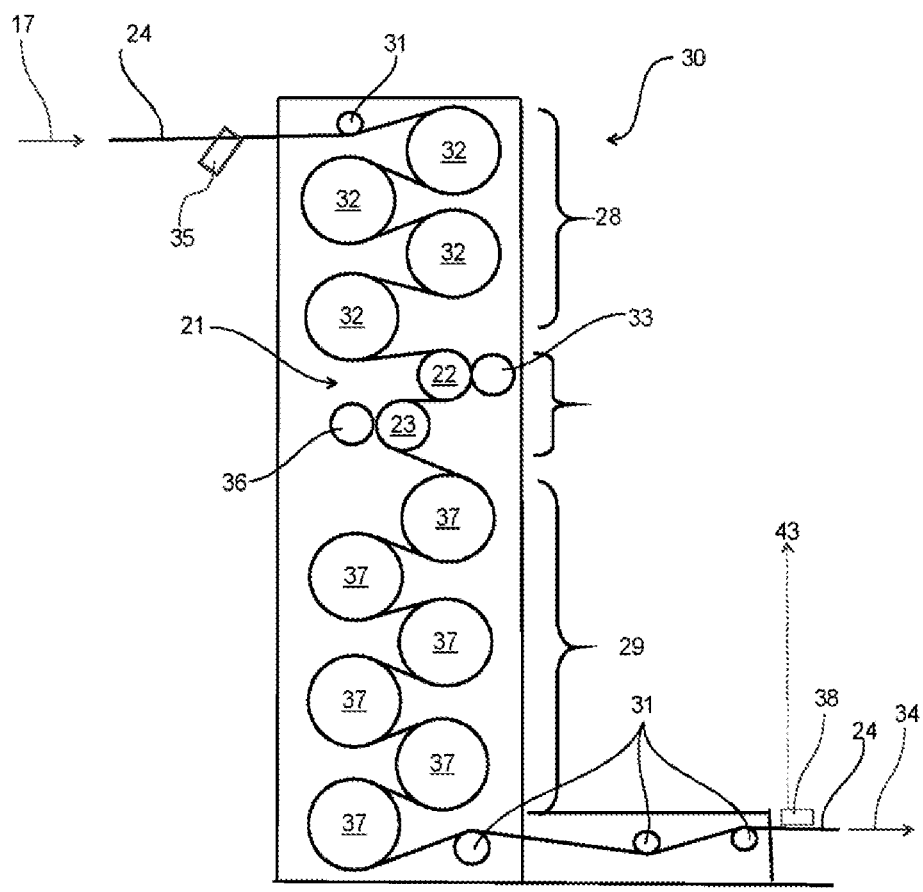

FIG. 2 an illustration of a stretching apparatus

Figure 3:
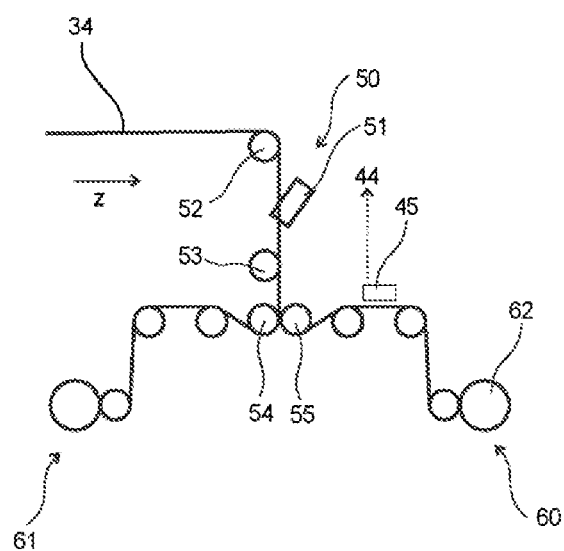

FIG. 3 an illustration of a winding device

FIG. 1 shows a device 1 for producing a tubular film, which initially comprises at least one extruder 2, whereby, for example, plastic present in pellet form may be plasticized. The plastic melt thus produced is supplied via a line 3 to a die head 4, where the melt is converted into a cylindrical melt stream, so that the melt stream can be drawn from an annular gap 5, not shown in the figure, in the haul-off direction z. A tubular film 6 is now present that has not yet solidified. This tubular film is inflated from inside by a slight positive pressure, so that the diameter thereof is larger within the optional calibration device 7. Solidification of the tubular film is effected by a fluid application device 8, often also called a cooling ring because of the ring-like configuration thereof that encompasses the tubular film. Because of the cooling effect, it is often also referred to as a temperature conditioning device.

After passing through the calibration device 7, the tubular film 6 enters the effective range of a collapsing device 9, in which the circular tubular film is converted initially into an elliptical cross-section of increasing eccentricity, until, in the zone of influence of the squeeze device, it eventually forms two superimposed film webs that are connected to each other at the lateral edges thereof. In other words, there now exists a two-layer film web 24.

The collapsing apparatus 9 is arranged so as to be rotatable, the axis of rotation being substantially aligned with the tube axis 11, which is indicated in FIG. 1 by a dashed-dotted line. The rotatability of the collapsing apparatus is indicated by the arrow 12.

The fluid application device 8 is subdivided into different circumferential portions. Each circumferential portion of the fluid application device is capable of applying to the tubular film a volume flow (amount of fluid per unit of time) that differs over the circumference of the tubular film, and/or a volume flow having a temperature that varies over the circumference of the tubular film. Air is preferably provided as the fluid. This enables the circumferential portion of the tubular film associated with the respective circumferential portion of the fluid application device to be individually temperature-conditioned, in particular to be cooled less, or even heated. Circumferential portions of the tubular film that "spread out" because of the lower cooling action of the fluid application device, form a thin spot 13. With greater cooling action, on the other hand, spreading-out is reduced, so that thick spots are formed here. Compared to the average thickness of the tubular film, thick spots and thin spots have a greater or lesser thickness, respectively.

In order for the thin spot to always arrive at a definite position of the collapsing device, it is also necessary for the thin spot to move along the circumference, which is indicated in the figure by the arrow 14. This "traveling" of the thin spot is implemented in such a way that the closest circumferential portion of the fluid application device, in the direction of the arrow 14, is altered in the parameters thereof, in order to now create a thin spot adjacent to the circumferential portion of the tubular film that has a thin spot at that time. The current thin spot is reduced in such a way that the corresponding circumferential portion of the fluid application device now returns to acting on the angle portion associated therewith with a stronger cooling effect.

In order to be able to record a thickness profile of the tubular film 6, a thickness measuring apparatus 18 may be provided, which is preferably arranged between the calibrating device 7 and the collapsing apparatus 9, as viewed in the transport direction z. The thickness measuring apparatus 18 comprises for example a measuring head that may determine at the current position thereof the thickness of the wall of the tubular film. In order to create the profile, the measuring head may be configured so as to be movable about the tubular film, in order to be able to repeat the measurement at different positions, which is illustrated by the double arrow 19. The distance between two positions, at each of which a thickness measurement may be performed, may be variably adjustable. In order to move the measuring head, same may be arranged to be displaceable on a track 20, the track 20 encompassing the tubular film in a ring shape.

Moreover, an evaluation and/or control device 40 is provided, with which the process according to the invention for starting up or stopping may be performed. Not shown are a display apparatus, in particular for displaying a status of the process, and an input apparatus, via which the operator can enter information.

In particular, the evaluation and/or control device 40 is able to control the fluid application device, so that a desired thickness profile can be created. This thickness profile, or the control parameters required therefor, may be created dynamically for the individual segments of the fluid application device, so that the resulting thickness profile travels along with the rotation of the collapsing device in phase and in particular with an offset. At the reversing points of the collapsing device, the offset is preferably 0. A data line 41 is provided to transmit control commands. As already described, the thickness measuring device 18 may measure a thickness profile. Measured values (in raw form or already as a thickness profile) are supplied to the evaluation and/or control device 40 via the data line 42. The evaluation and/or control device 40 may now evaluate the measured thickness profile and in particular modify the control parameters so that the measured thickness profile matches the desired thickness profile. A control loop is thus made available. According to the invention, it is additionally provided that the evaluation and/or control device 40 also takes into account the thickness profiles that have been recorded using the thickness measuring device 38 and using at least one of the thickness measuring devices 45. The influencing factors of these individual thickness measuring devices can be taken into account in weighted form when modifying the control commands. In particular, it is conceivable that the thickness profiles measured by the thickness measuring device 45 will be taken into account primarily for influencing the offset. It may be advantageous if the control parameters that are necessary for setting the target profile are stored when approaching a reversing point, and used or taken into account again in mirrored form when moving away from a reversing point. In this manner the values can be taken into account in case of a decrease in the offset in the reversing point in such a way that the same values are used to set the increase of the offset. This prevents the inertia of the control loop from resulting in undesirable thin or thick spots. It should be noted that in the description of the figures, also, the term "fluid application device" is a synonym for all possible ways of influencing the thickness profile of the film web. Therefore, also other or additional apparatus for imparting a thickness profile to the tubular film and/or to the two-layer film web and/or to the first and/or the second film web may be provided.

FIG. 1 also shows a reversing apparatus 15, which serves to guide the flattened tubular film from the collapsing device to the stationary roll 16 without any damage occurring. The arrow 17 indicates that this tubular film is now being routed to further processing, which will be explained in more detail in the following figures. "Reversing" in this context means that various elements, in particular the individual deflection rolls and turner bars, move back and forth between two end points. This movement is preferably a rotating or a pivoting movement. The end points, therefore, may also be referred to as reversing points.

By way of example, FIG. 2 now shows a stretching apparatus 30 that follows, inline, the device 1 shown in FIG. 1. However, within the scope of the present invention, a stretching device is not limited to the embodiment described below. "Inline" means that the two-layer flat web 24 is supplied from the device 1 directly from the production process, without transporting the film web in a manageable form.

The film web 24 moves into the stretching device 30 along the web transport direction z. Here it is first guided by the guide roll 31 to the heating rolls 32, which are each denoted by reference numeral 32. The task of the heating rolls 32 is to bring the already completely or partially cooled film web 24 back to a temperature that is sufficient for a stretching or straining process. Straining units, as a rule, carry out straining processes, i.e., the film has already cooled down and must be brought back up to straining temperature. Stretching processes, like they are used, for example, in blown-film extrusion are conceivable as well (in particular if the stretching apparatus is located inline downstream of a film extrusion line). In this case the film web has not yet completely cooled down.

In particular if a stretching device is located immediately downstream of a blown-film line, i.e., if the stretching takes place inline, a stretching device could also be referred to as a straining unit. However, this is more a question of definition rather than a technical point.

After the film web 24 has been brought back up, in the region 28 of the heating rolls 32, to a stretching temperature, it enters into the region of the stretching roll 22 and nip roll 33 and traverses through the gap between the two rolls 22, 33. Afterwards the film web 24 passes through the stretching gap 21, in order to then reach the surface of the stretching roll 23 and leave the stretching gap 21. The stretching roll 23 together with the nip roll 36 forms a roll gap. Owing to a lower circumferential velocity of the first pair of rolls 22, 33 relative to the second pair of rolls 23, 36, the film web 24 is lengthened, that is to say stretched, in the stretching gap 21. In the process, two effects occur that are not desired and make it necessary to cut off longitudinal strips at the sides of the film webs. The first effect is a reduction in the width of the film during stretching (the so-called neck-in). The second effect is a thickening of the edges of the film web. The size of the stretching gap, that is to say the distance between the lift-off edge of the film web 24 from the roll 22 to the arrival edge of the film web on the roll 23, may be designed to be variable. In this manner it is possible to influence the size of the neck-in and/or the thickening of the film web at the edges thereof.

After passing through the stretching gap, of which there may be multiple ones in a row, the film web 24 reaches a region 29 that comprises cooling rolls, each indicated by reference numeral 37, and in which the film web 24 is again cooled. After leaving this region 29, the film web 24 has again reached a somewhat lower temperature so that the surface thereof is able to withstand transport over the guide roll 31 in the transport direction z without any damage. The film web 24 continues to be conveyed, in the direction of the arrow 34, and is supplied at the end of an optional further processing to a winding device in which the film web is wound up either as a two-layer film web or separated into two individual layers. In principle it is not ruled out that the film web or the individual layers of the film web may receive longitudinal cuts and be wound up side by side in multiple sellable sizes.

Before the film web reaches the stretching device 30, a cutting or puncturing device 35 may be provided with which the two-layer film web may be slit or punctured, so that any air or other gas possibly still remaining within the two-layer film web would be able to escape. This measure leads to an improved quality of the stretching process and increased precision of the thickness profiles to be measured of the two-layer film web. In particular, provision may be made that the film web is cut longitudinally along or near a lateral edge, so that the two-layer film web remains connected only via one lateral edge. Furthermore, it may be desired to cut the two-layer film web at both lateral edges thereof. This is necessary in particular above certain thicknesses of the film web, as air may not be transported to a lateral edge of the film quickly enough.

A thickness measuring device 38, with which a thickness profile of the two-layer film web may be recorded after stretching thereof, is provided in transport direction behind the stretching apparatus 30. It should be noted, however, that without additional measures, only the total thickness of the film web, that is to say the sum of the thicknesses of the individual layers, can be measured here. It is conceivable however, in particular if the two-layer film web has received a longitudinal cut, to introduce a contrast agent, such as a metal sheet, between the two layers, so that each layer can be measured separately regarding the thickness thereof.

The thickness measuring device 38 may again be a measuring head that is arranged so as to be movable along a track extending at least partially transversely to the transport direction. The measuring head, again, is able to carry out a thickness measurement of the film web 24 at the current position thereof. Subsequently, the measuring head may be moved to an additional position, at which an additional measurement may be performed. It is not necessary, however, for the measuring head to be stopped in order to measure the thickness. Instead, it may be provided in principle that the measuring head performs measurements in adjustable time intervals, but that the speed of movement is variable. Thus it may be desirable in principle for example in connection with the present invention for the measuring head to be moved more slowly at the edges of the film web, in order to increase the density of the measurements here, thereby increasing the precision of the thickness profile at the edges. Moreover, it may be conceivable in principle that the thickness measuring device 38 may be configured and adapted to measure also beyond the edge of the film web, so as to be able to also provide information regarding the current width of the film web.

Lastly, FIG. 3 shows a film separating apparatus 50, which, although shown here in connection with two winding stations 60, 61, may be provided also independently thereof. The film web 34 may already have undergone pretreatment prior to entering the film separating apparatus. In particular, a first edge cut may already have taken place in order to already cut off a portion of the thickenings at the edge, thus leading to an improved quality of an optional pre-treatment. Additional cutting devices 51, in particular in the form of separating knives, are provided, which each perform the final edge trimming on one edge of the still two-layered film web. For this purpose the two-layer film web is guided over rolls 52 and 53, which primarily ensure the web tension required for the edge trimming. At the latest after the edge trimming, the two-layer film web is separated into two individual layers, which, however, are still directly superimposed.

The actual separation of the layers takes place by the rolls 54, 55, which form a roll nip. After passing through the roll nip, the first layer is fed to the first winding station 60, where it runs over various other rolls and is wound onto the film roll 62.

A second thickness gauge 45 is provided downstream of the separating device, the design and mode of operation of which is preferably similar to those of the thickness gauge 38. The measuring results (in raw form or as an evaluated thickness profile) are supplied to the evaluation and control device 40, for example by wire and/or wirelessly, via a data line 44.

The second layer may be fed to the winding station 61, the design and function of which is identical to the first winding station. Likewise, a second thickness gauge may be provided for measuring the second layer. Regarding the design and mode of operation, reference is made to the description in the preceding paragraph.

The thickness measurement profiles that are recorded downstream of the separating device may be continually added up by the evaluation and/or control device, in order to thus also be able to record a film-roll summation profile, that is to say a summation of the thickness profiles of the individual layers in a film roll. In a blown film line with reversing device but without stretching device, deviations of the film thicknesses from the average film thickness, that is to say thick and/or thin spots, are distributed in axial direction of the film roll, so that overall a uniform circumference of the film roll is created. However, if a stretching device is provided this can result in additional thick or thin spots that can no longer be compensated for by reversing. By creating a film-roll summation profile as described above, the formation for example of gauge bands (local thickenings) on the film roll can be detected early and can be taken into account when setting the control parameters for the fluid application device.

List of Reference Numerals

| | |
|---|---|
| 1 | device for producing a tubular film |
| 2 | extruder |
| 3 | line |
| 4 | die head |
| 5 | annular gap |
| 6 | film tube |
| 7 | calibration apparatus |
| 8 | fluid application device |
| 9 | collapsing device |
| 10 | |
| 11 | tube axis |
| 12 | arrow indicating rotatability of the collapsing apparatus |
| 13 | thin spot |
| 14 | arrow indicating "traveling" of the thin spot |
| 15 | reversing unit |
| 16 | roll |
| 17 | arrow indicating routing of the film tube to further processing |
| 18 | thickness measuring device |
| 19 | double arrow |
| 20 | track |
| 21 | stretching gap |
| 22 | stretching roll |
| 23 | stretching roll |
| 24 | layflat web |
| 25 | |
| 26 | |
| 27 | |
| 28 | region of the heating rolls |
| 29 | region of the cooling rolls |
| 30 | stretching device |
| 31 | guide roll |
| 32 | heating roll |
| 33 | nip roll |
| 34 | film web |
| 35 | cutting or puncturing device |
| 36 | nip roll |
| 37 | cooling rolls |
| 38 | thickness measuring device |
| 39 | |
| 40 | evaluation and/or control device |
| 41 | data line |
| 42 | data line |
| 43 | |
| 44 | data line |
| 45 | thickness measuring device |
| 46 | |
| 47 | |
| 48 | |
| 49 | |
| 50 | film separating apparatus |
| 51 | cutting apparatus |
| 52 | roll |
| 53 | roll |
| 54 | roll |
| 55 | roll |
| 56 | |
| 57 | |
| 58 | |
| 59 | |
| 60 | winding station |
| 61 | winding station |
| 62 | film roll |

The invention claimed is:

1. A process for starting up a film production in a film manufacturing machine, wherein the film manufacturing machine is a blown film machine, by means of a control device, comprising the following steps:
   detecting a start-up request;
   setting start-up parameters;
   providing film material;
   starting an interior bubble-cooling means for creating a film bubble;
   commencing the film production;
   cutting or puncturing the film bubble upstream of a haul-off apparatus; and
   setting film production parameters.

2. The process according to claim 1, wherein detecting a start-up request comprises registering an actuation, by the operator, of a switch on a control device.

3. The process according to claim 1, wherein, after detecting a start-up request, the control device issues a request to draw in film material over or through a component of the film manufacturing machine.

4. The process according to claim 1, wherein, prior to the commencement of the film production, a detection takes place of information regarding the drawing-in of the film material having taken place.

5. The process according to claim 1, wherein at least one start-up parameter is based on at least one of the following parameters:
   extremal parameters, which are defined as a maximum value that a mechanically-actuated component of the film manufacturing machine is able to assume;
   stored formula and production data from a prior film production; and
   parameters from a modelling of formula and production data.

6. The process according to claim 1, wherein, during or after the commencement of the film production, the film is wound up onto at least one film roll.

7. The process according to claim 1, further comprising optimizing the film production parameters after the commencement of the film production.

8. The process according to claim 1, further comprising switching on at least one control loop, in order to regulate at least one film production parameter.

9. The process according to claim 1, wherein the setting of start-up parameters comprises at least one of the following steps, wherein the control device issues a control command to perform the respective step:
   providing raw materials for a start-up formula;
   setting a moveable component of the film manufacturing machine to maximum opening width;
   setting a predetermined output performance of an extruder of the film manufacturing machine;
   setting a predetermined temperature of an extruder of the film manufacturing machine;
   setting a volume flow of a fluid with which the film material will be cooled directly or indirectly;
   setting a position of a slideable component of the film machine relative to a principal axis of inertia of the film material;
   setting a predetermined angle of a rotatable or pivotable component of the film manufacturing machine relative to the principal axis of inertia of the film material.

10. The process according to claim 1, wherein the setting of start-up parameters relates to at least one of the following components of the film manufacturing machine, the control device issuing at least one control command to the respective component:
   an extruder
   a cooling ring
   an air routing apparatus
   an interior bubble-cooling means
   a calibration cage
   a collapsing apparatus
   a haul-off apparatus a reversing apparatus
a turner bar
a stretching unit
a cross-cutting apparatus
a longitudinal cutting apparatus
a transport roll
a flatness measuring apparatus
a thickness measuring apparatus
a winding apparatus
a supply apparatus for a raw material.

11. The process according to claim 1, further comprising the following steps after providing the film material and prior to setting film production parameters:
creating a longitudinal cut in a film bubble of the film material by means of a cutting apparatus that is arranged upstream of the haul-off apparatus;
flattening the film bubble to form a two-layer film web;
inserting at least one lateral edge slitting apparatus between the layers of the two-layer film web via the longitudinal cut;
sliding the lateral edge slitting apparatus to a lateral edge of the two-layer film web.

12. A process for terminating a film production in a film manufacturing machine, wherein the film manufacturing machine is a blown film machine, by means of a control device, comprising the following steps:
detecting a termination request;
adjusting termination parameters to enable a controlled slowing of a film transport to a standstill, such that a remnant of the film produced remains in a film production line; and
terminating the film production.

13. A blown film manufacturing machine, the blown film manufacturing machine comprising:
at least one extruder for producing and providing molten plastic material;
a die device from which the molten plastic material can be is drawn in the form of a film;
at least one transport roll;
at least one winding device whereby the film can be wound up; and
at least one control device configured to issue control commands to:
detect a start-up request;
set start-up parameters;
provide film material;
start an interior bubble-cooling means for creating a film bubble;
commence the film production;
cut or puncture the film bubble upstream of a haul-off apparatus; and
set film production parameters.

14. A computer program product comprising instructions which, when the program is executed on a control device comprising a computer, cause a film manufacturing machine to:
detect a start-up request;
set start-up parameters;
provide film material;
start an interior bubble-cooling means for creating a film bubble;
commence the film production;
cut or puncture the film bubble upstream of a haul-off apparatus; and
set film production parameters.

* * * * *